(12) United States Patent
Fleming et al.

(10) Patent No.: US 6,630,752 B2
(45) Date of Patent: Oct. 7, 2003

(54) UNINTERRUPTIBLE TRANSFER SWITCH

(75) Inventors: David J. Fleming, Cardiff, CA (US); Hassan Yarpezeshkan, La Jolla, CA (US)

(73) Assignee: Qualmag, Inc., San Diego, CA (US)

( * ) Notice: Subject to any disclaimer, the term of this patent is extended or adjusted under 35 U.S.C. 154(b) by 0 days.

(21) Appl. No.: 09/955,405

(22) Filed: Sep. 12, 2001

(65) Prior Publication Data

US 2003/0048004 A1 Mar. 13, 2003

(51) Int. Cl.$^7$ ............................................. H02J 4/00
(52) U.S. Cl. ........................... 307/64; 307/70; 307/80; 307/85
(58) Field of Search ........................ 307/64, 80, 85, 307/66, 70

(56) References Cited

U.S. PATENT DOCUMENTS

| | | | |
|---|---|---|---|
| 4,743,999 A | * 5/1988 | Hames | 361/56 |
| 5,343,079 A | * 8/1994 | Mohan et al. | 307/105 |
| 5,642,002 A | * 6/1997 | Mekanik et al. | 307/64 |
| 5,801,937 A | * 9/1998 | Gold et al. | 363/141 |
| 5,901,057 A | 5/1999 | Brand et al. | |
| 6,023,152 A | * 2/2000 | Briest et al. | 323/207 |
| 6,037,752 A | 3/2000 | Glennon | |
| 6,051,893 A | * 4/2000 | Yamamoto et al. | 307/43 |
| 6,118,676 A | 9/2000 | Divan et al. | |
| 6,175,166 B1 | 1/2001 | Bapat | |

* cited by examiner

Primary Examiner—Stephen W. Jackson
Assistant Examiner—Robert L DeBeradinis
(74) Attorney, Agent, or Firm—Fish & Richardson P.C.

(57) ABSTRACT

An uninterruptible transfer switch (UTS) coupled to two or more power sources and a load, said UTS including switches and an inverter, powered through one of several sources routed through rectifiers, capable of sensing power quality of two or more power sources and automatically switching sources when the primary power source is degraded to a predetermined limit and the switching of sources occurring without appreciable power loss on the load side of the UTS.

16 Claims, 7 Drawing Sheets

UNINTERRUPTIBLE TRANSFER SWITCH

TECHNICAL FIELD

This invention relates generally to a system for an electrical power switch and more particularly to an automatic electrical switch for providing power to a load on a continuous, uninterrupted basis from multiple sources.

BACKGROUND

1. Field of the Invention

Modern industrial uses for electricity have become more sensitive to power quality. For example, applications such as telecommunications, health care, process control and computing require reliable power that cannot tolerate even brief interruptions. Yet, the availability of reliable power from single sources such as the utility grid has diminished significantly. To address these issues, modern power systems with requirements for high reliability have one or more alternate sources. When power from the primary source is interrupted, one of the secondary sources is tapped without appreciable interruption to the load. This invention provides highly reliable, continuous power to the load from one or more sources, independent of voltage, current and frequency.

2. Problem

With the advent of electronics, control of power to loads with manually activated switches has given way to systems that sense power quality and switch automatically to an alternate source. FIG. 1 depicts the modern power switch architecture. Modern power switching systems generally fall into two basic categories: those referred to as "Automatic Transfer Switches" (ATS) and those referred to as "Static Transfer Switches" (STS). The fundamental difference between the ATS and STS is the types of switches that make and break the electrical connection between the source and the load.

The switching element used by the ATS is the contactor. This is typically a solenoid-actuated device with a single pole per phase and one contactor is typically used per source. The switching operation is performed as follows: first the switch attached to the degraded source is opened; second, once the degraded source is electrically removed from the load the contactor to the alternate source is closed. This "break before make" or "open transition" action (where the degraded source is removed prior to the alternate source being brought on-line) is required for several reasons: to prevent the alternate source from feeding power back to the other loads on the primary source's system; to prevent the alternate source from being affected by the condition that may have caused the primary source to malfunction; and to avoid having to synchronize the voltage between the two sources.

Due to the mechanical nature of the ATS switching device, the delay between the opening of the first switch and the closing of the second may be as long as a couple of hundred milliseconds. This type of power interruption is unacceptable in many modern applications. Therefore, an alternative in the form of an STS has been developed to help address this problem.

The STS utilizes semiconductors as the switching element. Most modern systems configure Silicon Controlled Rectifiers (SCRs) in an "anti-parallel" manner. As such, each phase of each source requires two SCRs; one for conducting current in each direction for a total of twelve SCRs in a three phase STS system with two sources. SCRs are chosen because they provide the lowest "on state" voltage drop at the current levels that such switches are typically encountered in industrial applications.

Switching operation by an STS is performed by removing a gating signal from the SCRs controlling power from the degraded source and then applying a gating signal to the SCRs controlling power from the alternate source. The sequence of these operations can be controlled to minimize discontinuity in power and prevent the two sources from being connected through the switch.

Typically, the STS will switch power sources within 0.25 cycles of the incoming power signal. However, load and source characteristics can significantly affect the timing and quality of the transition. For instance, when current and voltage are not in-phase, the SCRs (which can only be commutated off during a zero crossing of current through them) may take significantly longer. Even though the STS is faster than ATS in switching power sources, like the ATS, the load side of the STS experiences a brief power loss. Other significant disturbances can occur when the voltage sources are not synchronized and the STS effects an instantaneous phase change on load.

SUMMARY

The present invention, the Uninterruptible Transfer Switch (UTS), combines the strengths of the ATS and STS and can provide better switching performance, higher reliability, lower power dissipation, smaller physical size and can switch sources without appreciable power interruption to the load.

The system consists of switches coupled to the power sources. An inverter is coupled to the load side of the switches. As with the ATS, there is a brief period during which the switches of all of the sources are not connected to the load. During this period, the UTS includes an inverter which can include an alternate energy storage device to supply power to the load. The inverter or energy storage device can be powered through an auctioneering circuit consisting of rectifiers that connect to all of the sources. Once the power transfer is complete, the inverter or energy storage device is returned to a standby state until further source switching is required.

Numerous benefits are realized from the present invention. For example, during the source transfer operation, the UTS provides an increased power quality to the load. There is no appreciable power interruption when transferring between sources. Because the voltage across the switch transferring in the new source is nearly zero, switch life is considerably improved. Moreover, because the inverter supplies power during the transfer time, and is typically otherwise on standby, the heat removal apparatus as required by a STS is not necessary. If cooling is used it can be turned on for brief periods and then turned off. This results in increased system reliability and lower operating cost.

In one embodiment of the invention that utilizes mechanical contactors to switch power sources, it is not necessary to have "active" or semiconductor components in the current path—only copper wire in the choke and the contacts of the mechanical switch. This provides increased reliability and capacity to handle to transient current but with the desirable attributes of switching semiconductors. Additionally, in this embodiment, the power loss in the switch and choke is significantly lower than in switching semiconductors like those in the ATS.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
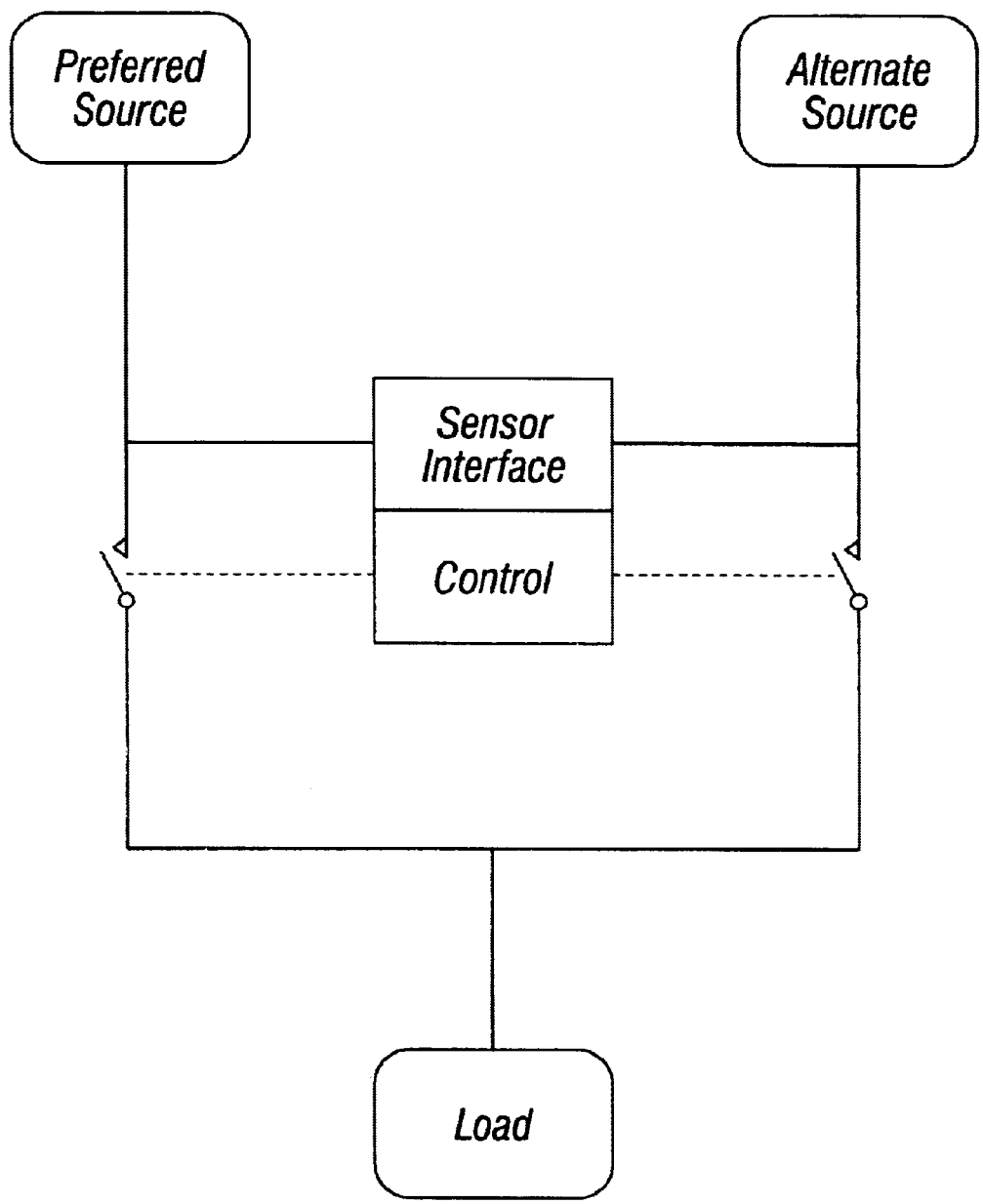
FIG. 1 is block diagram of prior art modem power switch architecture.
Figure 2:
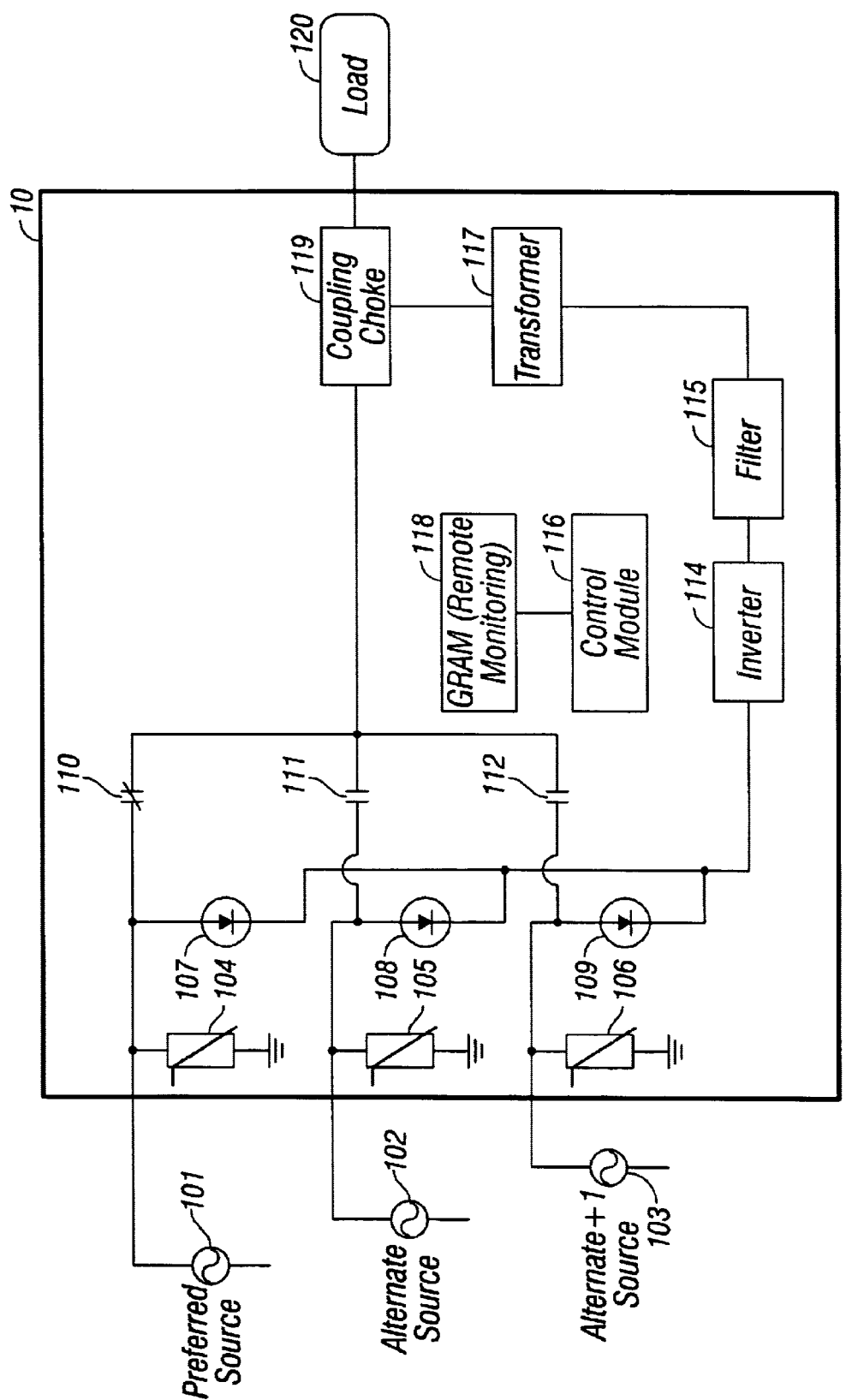
FIG. 2 is a block diagram of one embodiment of the UTS.

A preferred embodiment of the present invention is illustrated in FIG. 2. Referring to FIG. 2, a UTS 10 is coupled to power sources 101, 102, 103 and a load 120. While shown as single lines, the power sources 101, 102, 103 can be multi-phase or single-phase system. Switches 110, 111, 112 isolate each of the power sources from the load 120. A source designated as the "preferred source" 101 is the power source that will be selected by the UTS 10 as long as that source meets certain pre-determined power quality requirements such as amplitude, phase, and frequency stability. Surge suppressors 104, 105, 106 can be used to protect the load 120 from transient events that may occur up-stream of the UTS 10.

A choke 119 is in-line with the load 120. The choke 119 is typically a passive, low loss, element that performs no significant function during normal operation of the UTS 10. The choke 119 can pass current from the selected source to the load. The choke 119 may be a standard choke or a coupled inductor. The choke can also be replaced with any of a variety of well-known transformers used in power applications, like isolation transformers.

Rectifiers 107, 108, and 109 are coupled to the source side of the switches 110, 111, 112. During normal operation, i.e., non-transient power conditions, any of the rectifiers 107, 108, 109 can feed an inverter 114 from any power source, typically one with the highest voltage. Because the inverter 114 can be controlled in the manner described below, in a low power, "stand-by" state, the current passed through the rectifiers can be minimal and therefore power dissipation is advantageously low. During stand-by operation, the inverter 114 can also be used to regulate voltage to the load 120 and to improve power factor of the load 120. When the power sources are being switched, i.e., during transient conditions, the inverter 114 is used provide power to the load 120.

The inverter 114 input can include a bank of electrolytic capacitors (not shown) used in conjunction with the rectifiers to sufficiently "smooth" the input voltage to the inverter 114. During normal operation, the inverter 114 maintains a sinusoidal voltage at the output of filter 115 and the auto transformer 117 substantially equal in amplitude at the load 120. Therefore, the aggregate affect of the UTS 10 on system power during normal operation is minimal.

Figure 3:
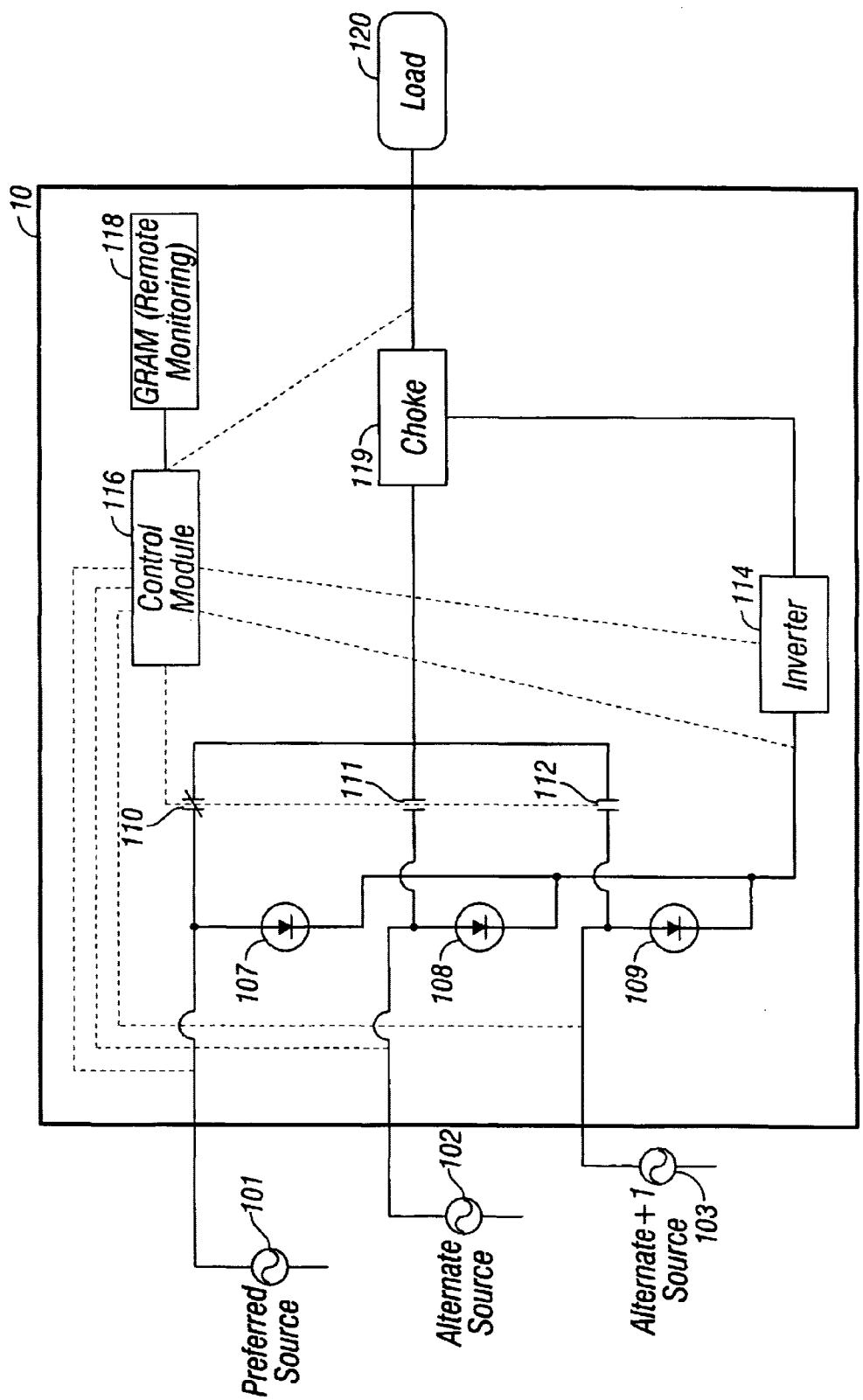
FIG. 3 is a block diagram of the UTS depicting possible monitoring functions of the control module.

Control module 116 can control the operation of the UTS 10, including switches 110, 111, and 112. Referring to FIG. 3, the control module 116 can sense power quality from the sources 101, 102, 103 as well as their respective power output quality, for instance, voltage, current, phase and frequency. For example, using DQ transformation as well as individual line-line criteria, the power quality of all of the input power sources can be monitored by control module 116.

The operator can program the control module 116 to operate elements of the UTS 10 in accordance with the requirements of the load 120. That is, the program can be altered depending upon the system requirements of the load 120, that is, how sensitive the load 120 is to changes in power quality. When the power quality of the presently utilized source falls outside of user-determined bounds for a predetermined time period, the control module 116 can initiate the process of switching to another source. For that reason, the control module 116 is coupled and can control actuation of switches 110, 111, and 112. Because the control module 116 can monitor all sources, an alternate source can be identified at all times.

The control module 116 can also monitor power quality coming into the inverter 114. Likewise, the control module 116 can also monitor power quality coming out of the inverter 114 (not shown). This may be particularly useful in controlling the operation of the inverter 114 so that power quality, like voltage, current, frequency and phase is monitored and maintained by controlling the operation of the inverter 114. The control module 116 can also activate, operate and deactivate the inverter 114.

The control module 116 can also monitor power quality input to the load 120. This will help the control module 116 to prevent undesirable power quality from reaching the load 120. Those of skill in the art will appreciate that the control module 116 can perform additional functions; for example, maintenance and diagnostic functions. For example, the control module 116 can include memory functions to keep a history of UTS operation and the variables associated with UTS operation.

Once the control module 116 has detected an out of specification condition in the preferred source 101, i.e., transient power condition, the control module can initiate steps directed to changing power sources without appreciable interruption in power supplied to the load 120. For example, the procedure delineated in FIG. 4 can be initiated. This begins with a signal that triggers the inverter 114 to active mode. During the normal state, the inverter 114 can be in a standby mode passively synchronized to the power source.

Upon receipt of the command to control output voltage, for example from the control module 116, the inverter 114 draws power from the one or more of the rectifiers 107, 108, 109 and begins furnishing power to the load 120. Following activation of the inverter 114, the control module 116 can issue a command resulting in the opening of switch 110 thereby disconnecting the failing source 101 from the load 120.

Referring again to FIG. 4, the actual operation of switches 110, 111, 112 lags the respective open or close command by tens of milliseconds or more. During the transient power condition, the inverter 114, fed by any of the available power sources, provides power to the load in synchronization with the preferred source 101. Once the switch 110 for the preferred source 101 is opened, the inverter 114 is commanded by the control module 116 to change power output, for instance amplitude, frequency and phase, to match that of the new source, e.g., alternate source 102. Power inputs from the various sources may not be matched in voltage, current, frequency or phase. In order that the load 120 remains undisturbed by the power transfer activity, such changes must occur gradually. The synchronization of the inverter 114 to the new source is accomplished at a user-defined rate, typically less than a second. The user-defined rate can be pre-programmed into the control module 116 and is typically dependent on application, i.e., the power requirements of the load 120.

Once the inverter 114 has synchronized with the new power source, e.g., alternate source 102, the switch coupled to this source, for example 111, is commanded closed. Operation of switch 111 actuation lags the command by approximately tens of milliseconds. In the interim, the inverter 114, fed via the rectifiers from any of the available sources, for example, rectifier 108, continue to supply appreciably uninterrupted power to the load 120. The alternate source 102 can be power provided by a utility different than that providing power via source 101. Alternately, alternative source 102 can be power provided by any well-known power generating means, for example, a generator.

When the new source contactor is closed, for example 111, the system is now able to draw power directly from the new source, in this case, source 102. At this time, the control module 116 commands the inverter 114 to standby mode and the process is complete. Accordingly, the UTS 10 can deliver two (or more) sources to the load 120 regardless of which source is being utilized.

Figure 5:
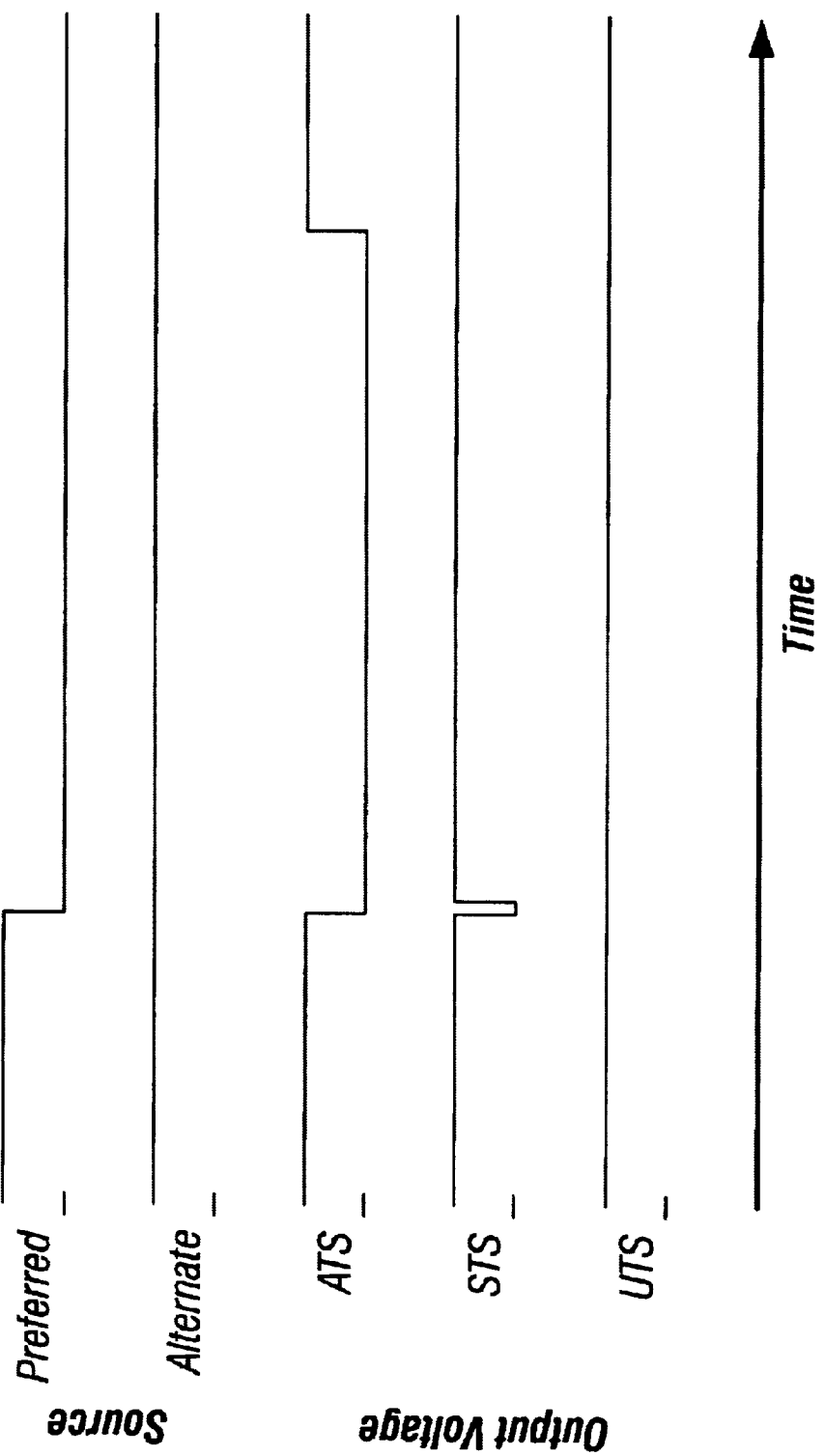
FIG. 5 is a timing diagram depicting the operation of various technologies during power interruption.

FIG. 5 illustrates exemplary composite voltage waveforms, as seen by the load 120, for the three alternative systems during a transient power condition. In this case, the transient power condition is depicted as a voltage drop in the preferred source. Those of skill in the art will appreciate that the prior art STS experiences a long interruption in voltage output experienced by the associated load due in part to the use of mechanical contactor switch elements as described earlier. In contrast, the ATS described earlier uses semiconductor switches that can be actuated faster than the STS. Hence, the voltage output interruption seen by the load associated with the ATS has a shorter voltage interruption. In contrast, the load 120 associated with UTS 10 experiences no voltage interruption. FIG. 5 is exemplary. The UTS 10 can be configured in numerous ways, depending partly on the power requirements of the load 120, so that during a transient power condition, the load 120 experiences no appreciable power quality interruption that might otherwise adversely affect the operation of the load 120.

Figure 6:
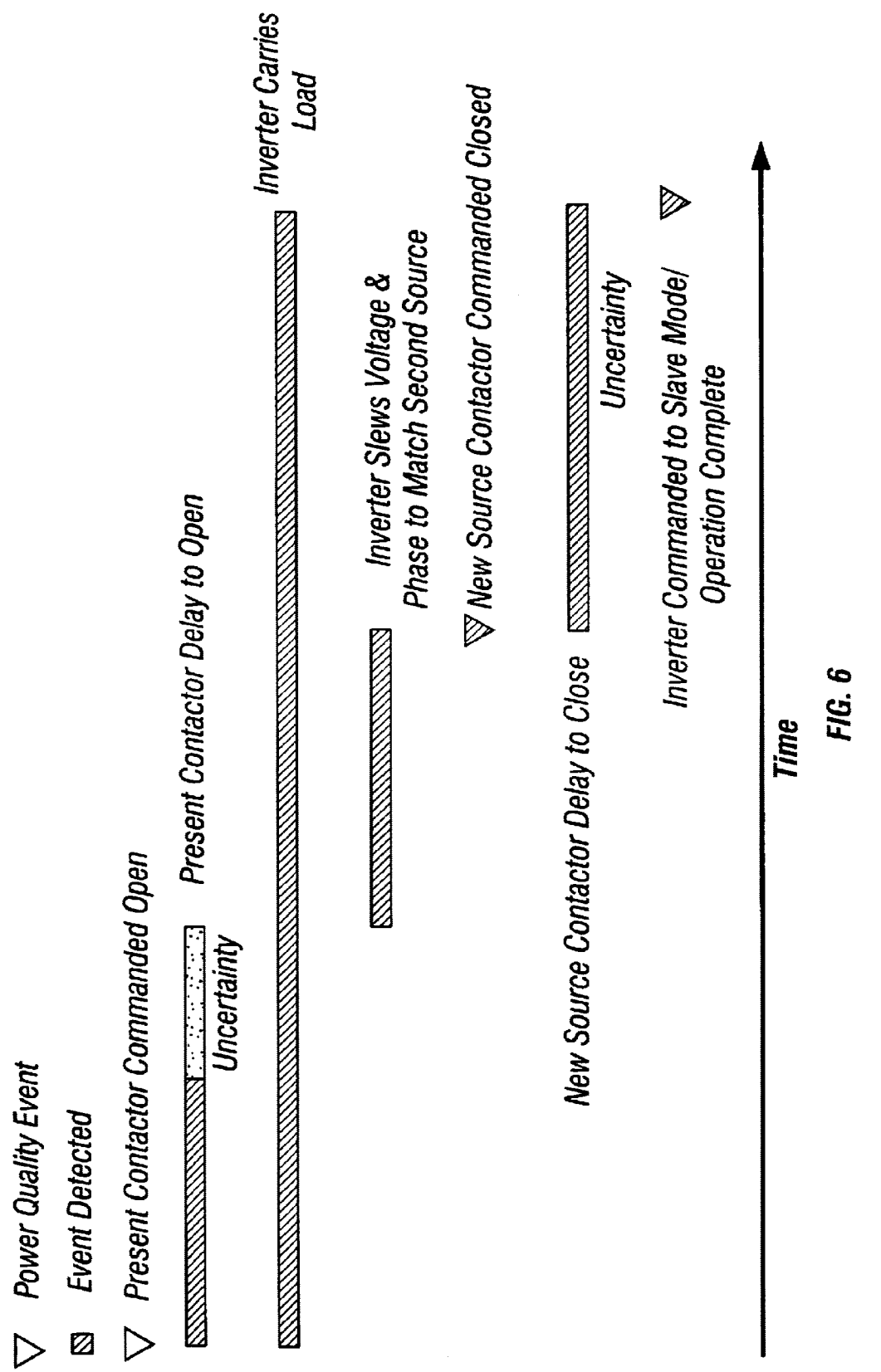
FIG. 6 is an exemplary UTS operational timeline.

FIG. 6 provides an example of a method of uninterruptible power transfer by the UTS 10. Time (not necessarily to scale) is represented on the horizontal axis. Pertinent events are indicated on the vertical axis in chronological order beginning at the upper left corner. The sequence normally begins with a power quality event. However, it may also be initiated by an external signal from an operator or controlling device. The power quality ("PQ") event is a power disruption of the presently utilized source, i.e., the UTS 10 determined that the power quality is out of acceptable limits. Once the PQ event is detected, the switch coupling the present source with the load is commanded open. Opening the switch has some delay. Additionally, there is uncertainty in the power transfer time. Regardless of the switch operation, the inverter simultaneously begins supplying power to the load as soon as the PQ event is detected. Once the switch coupled to the failing source is open, the inverter begins slewing its power output (amplitude, frequency and phase) to match the new source. When the inverter and the new source are sufficiently synchronized, the switch connected to the new source is commanded closed. Again, uncertainty due to the nature of the switch requires that the inverter carry the load for the worst-case transfer time of the switch. Once this time has passed, the inverter goes into standby mode, i.e., it no longer carries the load and the transfer operation is complete. By this method, the UTS 10 provides substantially uninterrupted power to the load, regardless of the power quality event.

Figure 4:
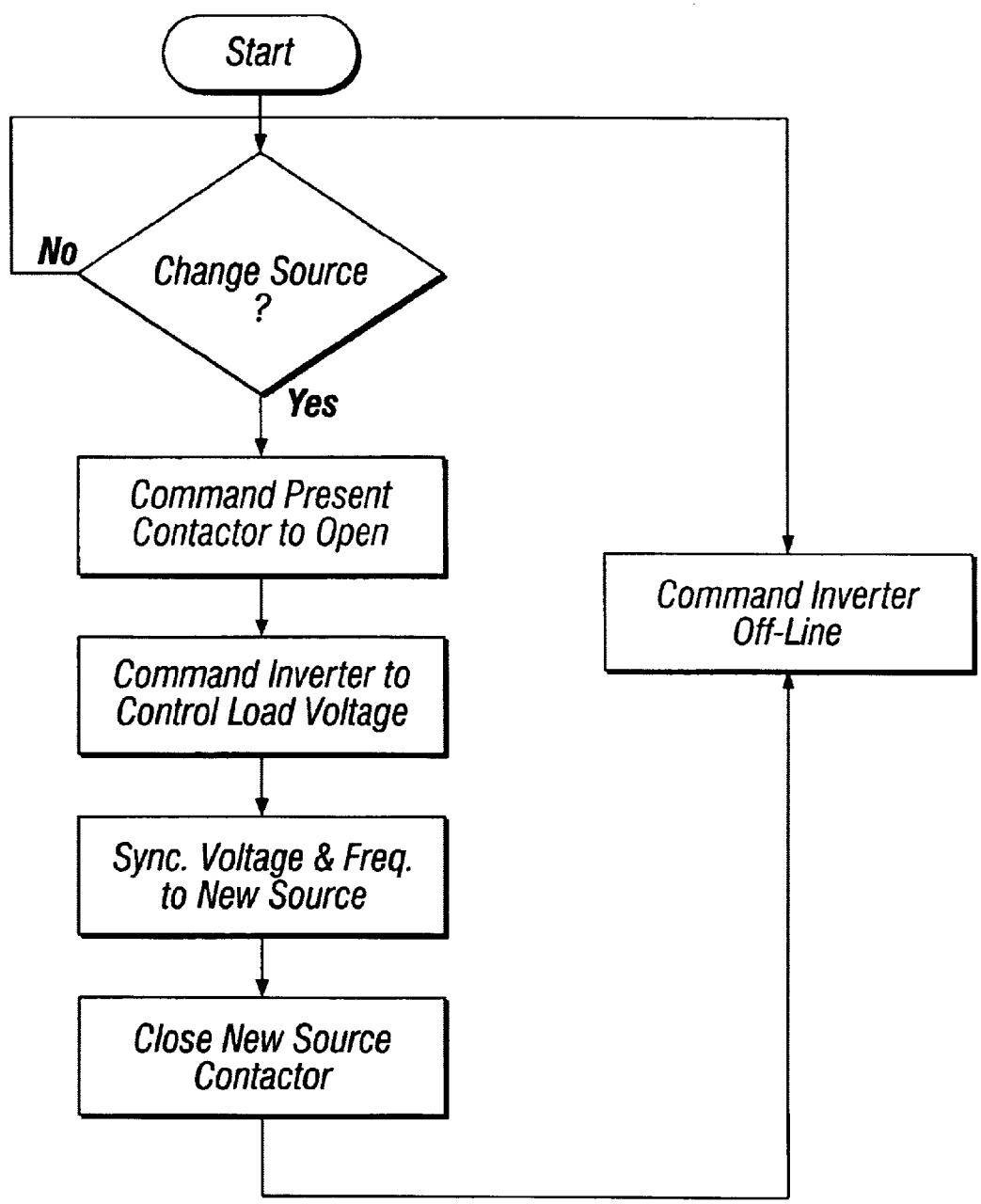
FIG. 4 is an exemplary state diagram of the UTS control module.

Returning again to FIG. 2, the system inverter 114 drives a filter 115 that is used to smooth the affect of any modulation on the output voltage and current during power transfer described in FIG. 4. The autotransformer 117 is used to boost the output voltage of the inverter 114 to the requirements of the load 120. This may be necessary if the rectified power entering the inverter 114 does not have sufficient voltage to meet the load voltage requirement. The choke 119 serves to isolate the load 120 and the inverter 114 output from a degraded source during the switch transition. Once the load 120 has been transferred to the new source and the inverter 114 returned to standby mode, the choke 119 is once again a simple inductor, in-line with the load.

Referring to FIG. 2, remote monitoring unit 118 can be coupled to control module 116. During all modes of operation, the remote monitoring unit 118, also referred to as GRAM (Global Remote, Advanced Monitoring) provides a means of remotely monitoring and/or controlling UTS 10. Remote monitoring unit 118 can transmit or receive UTS 10 system information concerning some or all of the UTS 10 system state variables, for example, operating amplitudes, frequencies, integrity of system components, availability and selection of power sources, etc. GRAM 118 can also control some or all of the UTS 10 system state variables, like inverter 114 operation, source selection, etc. GRAM 118 can transmit and receive this information to external remote devices using any well-known communication technology, e.g., satellite link, cellular link, telephone link, etc. Additionally, GRAM 118 can communicate to remote devices like laptop computers, via several different communication protocols such as TCP/IP, MODBUS, etc.

Figure 7:
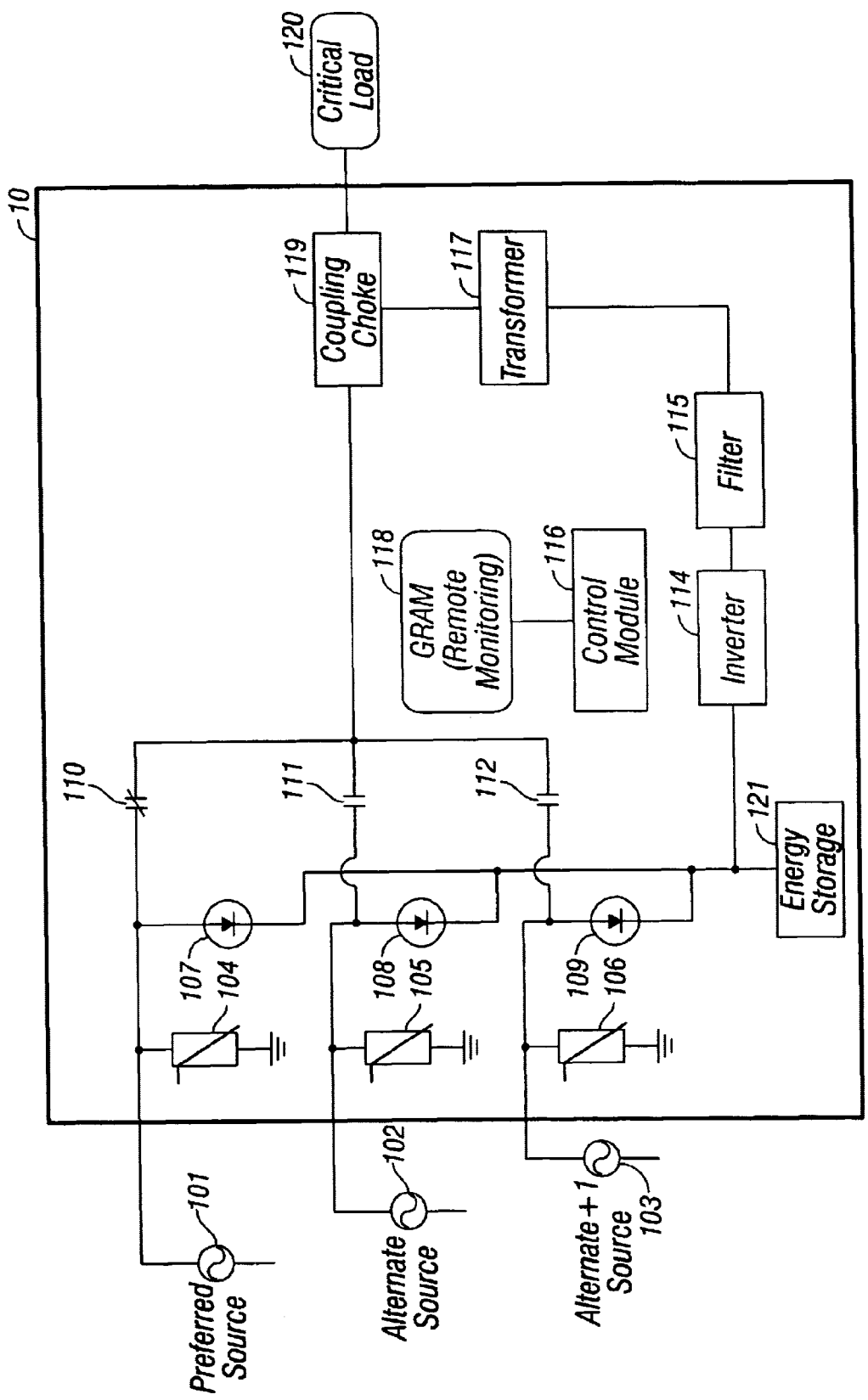
FIG. 7 is another embodiment of the UTS.

Referring again to FIG. 7, the UTS 10 system configuration includes the addition of energy storage element 121. Energy storage element 121 provides energy to the inverter independent of all sources. In this way, the energy storage element 121 enables the system to "ride-through" instances when none of the power sources are able to provide power to the load. In this way, the system can be configured so that the alternative power source need not be readily available, for example, an engine-driven generator or turbine. Thus, the energy storage element 121 can provide energy to the inverter while and until the alternative source is able to generate power. Energy storage element 121 can consist of any well-known components, e.g., generator, turbine, electro-chemical capacitors, double layer capacitors, battery, electrolytic capacitors, hybrid capacitor/battery, fuel cell, super capacitor, HED (high energy-density) capacitor, etc. For example, the battery can be any well known type like lead acid, lithium, NiCAD, NiMH, etc.

A number of embodiments of the invention have been described. Nevertheless, it will be understood that various modifications may be made without departing from the spirit and scope of the invention. For example, different types of switches, like SCRS, IGBTs, FETs, bipolar transistors, etc. can be utilized. Alternately, mechanical switches with actuators can be utilized. Likewise, many well-known different types of rectifiers can be utilized, e.g., 6 pulse rectifiers, 12 pulse rectifiers, synchronous rectifiers, etc. Various types of power sources can be coupled to the UTS, like flywheel, utility power, generators, and/or static or rotary UPSs. These power sources can have various amplitudes, frequencies and phase depending mainly on load requirements. Moreover, the control module can be one unit within the UTS, or it can consist of several separate components distributed throughout the UTS. Accordingly, other embodiments are within the scope of the following claims.

What is claimed is:

1. An uninterruptible transfer switch coupled to at least two power sources and a load comprising:
   a first switch having a first and second end, said first end coupled to a first power source, said second end coupled to said load;
   a second switch having a first and second end, said first end coupled to a second power source, said second end coupled to said load;
   a control module coupled to said first and second switch, said control module capable of actuating said first and second switch in order to select said power sources received by said load;
   an inverter for providing power to said load when said control module actuates said first and second switches;
   a first rectifier, having a first and second end, said first end coupled to said first end of said first switch, said second end of said rectifier coupled to said inverter;
   a second rectifier, having a first and second end, said first end coupled to said first end of said second switch, said second end of said second rectifier coupled to said inverter.

2. An uninterruptible transfer switch as recited in claim 1 wherein said first and second switches comprise contactors.

3. An uninterruptible transfer switch as recited in claim 1, wherein said first and second switches comprise SCRs.

4. An uninterruptible transfer switch as recited in claim 1, further including a remote monitoring unit coupled to said control module for transmitting and receiving system information.

5. An uninterruptible transfer switch coupled to at least one power source from a utility and a load comprising:
   a first switch having a first and second end, said first end coupled to said power source from a utility, said second end coupled to said load;
   an alternate power source;
   a second switch having a first and second end, said first end coupled to said alternate power source, said second end coupled to said load;
   a control module coupled to said first and second switch, said control module capable of actuating said first and second switch in order to select power sources received by said load;
   an inverter for providing power to said load when said control module is actuating said first and second switches;
   a first rectifier, having a first and second end, said first end coupled to said first end of said first switch, said second end of said rectifier coupled to said inverter;
   a second rectifier, having a first and second end, said first end coupled to said first end of said second switch, said second end of said second rectifier coupled to said inverter.

6. An uninterruptible transfer switch as recited in claim 5, wherein said alternative power source comprises a generator.

7. An uninterruptible transfer switch as recited in claim 5, further including an energy source, said energy source coupled to said inverter, said energy source for providing power to said inverter when said control module is actuating said first and second switches.

8. An uninterruptible transfer switch as recited in claim 7, wherein said energy source comprises a generator.

9. An uninterruptible transfer switch as recited in claim 7, wherein said energy source comprises a fuel cell.

10. An uninterruptible transfer switch as recited in claim 7, wherein said energy source comprises a super capacitor.

11. An uninterruptible transfer switch coupled to at least two power sources and a load comprising:
    a first switch having a first and second end, said first end coupled to a first power source, said second end coupled to said load;
    a second switch having a first and second end, said first end coupled to a second power source, said second end coupled to said load;
    a choke coupled to said load, said first and second switch for electrically isolating said power sources and said inverter during switching of said power sources;
    A control module coupled to said first and second switch, said control module capable of actuating said first and second switch in order to select power sources received by said load;
    an inverter for providing power to said load when said control module actuates said first and second switches;
    an inductor coupled to said load, said first and second switch, said inductor electrically isolating said power sources and said inverter from said load during switching of said power sources;
    a first rectifier, having a first and second end, said first end coupled to said first end of said first switch, said second end of said rectifier coupled to said inverter;
    a second rectifier, having a first and second end, said first end coupled to said first end of said second switch, said second end of said second rectifier coupled to said inverter.

12. The uninterruptible transfer switch recited in claim 11 wherein said inductor comprises a transformer.

13. The uninterruptible transfer switch recited in claim 11 wherein said inductor comprises a choke.

14. The uninterruptible transfer switch recited in claim 11 further including surge suppressors coupled to said first ends of said first and second switch.

15. An uninterruptible transfer switch coupled to a first power source, a second power source and a load comprising:
    a first switch means for transferring power to said load, said first switch means having a first and second end, said first end coupled to a first power source, said second end coupled to said load;
    a second switch means for transferring power to said load, said second switch means having a first and second end, said first end coupled to a second power source, said second end coupled to said load;
    control means for actuating said first and second switch in order to select the power source received by said load, said control means coupled to said first and second switch;
    inverter means for providing power to said load when said control means actuates said first and second switches in order to alternate power source received by said load;
    an inductor means for electrically isolating said sources and inverter means during switching of power from one power source to another, said inductor means coupled to said load, said first and second switch, and said inverter;

a first rectifier means for providing power to said inverter means, said rectifier having a first and second end, said first end coupled to said first end of said first switch means, said second end of said rectifier coupled to said inverter means;

a second rectifier means for providing power to said inverter means, said rectifier having a first and second end, said first end coupled to said first end of said second switch means, said second end of said second rectifier coupled to said inverter means.

16. A method of switching power sources from a primary power source to an alternative power source without appreciable power loss to the load comprising:

monitoring power quality of a preferred power source and an alternate power source;

determining from a predefined set of power quality variables that the power quality from the primary source has degraded to an unacceptable level;

opening all switches that route the primary power source to the load;

supplying power to the load from the inverter at the time that the primary power source is disconnected from the load so that no appreciable power loss occurs on the load;

slewing amplitude and phase of power provided by the inverter to the load so that it substantially matches the amplitude and phase of alternative power source;

closing the switch that routes power from the alternative power source to the load;

taking the inverter off line so that the load receives power from the alternative power source without appreciable power loss on the load.

* * * * *